Dec. 10, 1963 L. A. VESTERMARK 3,113,530
APPARATUS FOR FILLING BUNS WITH AN EDIBLE PRODUCT
Filed Feb. 12, 1962 6 Sheets-Sheet 1

INVENTOR.
LYLE A. VESTERMARK
BY
*Clark-Ott*
ATTORNEYS

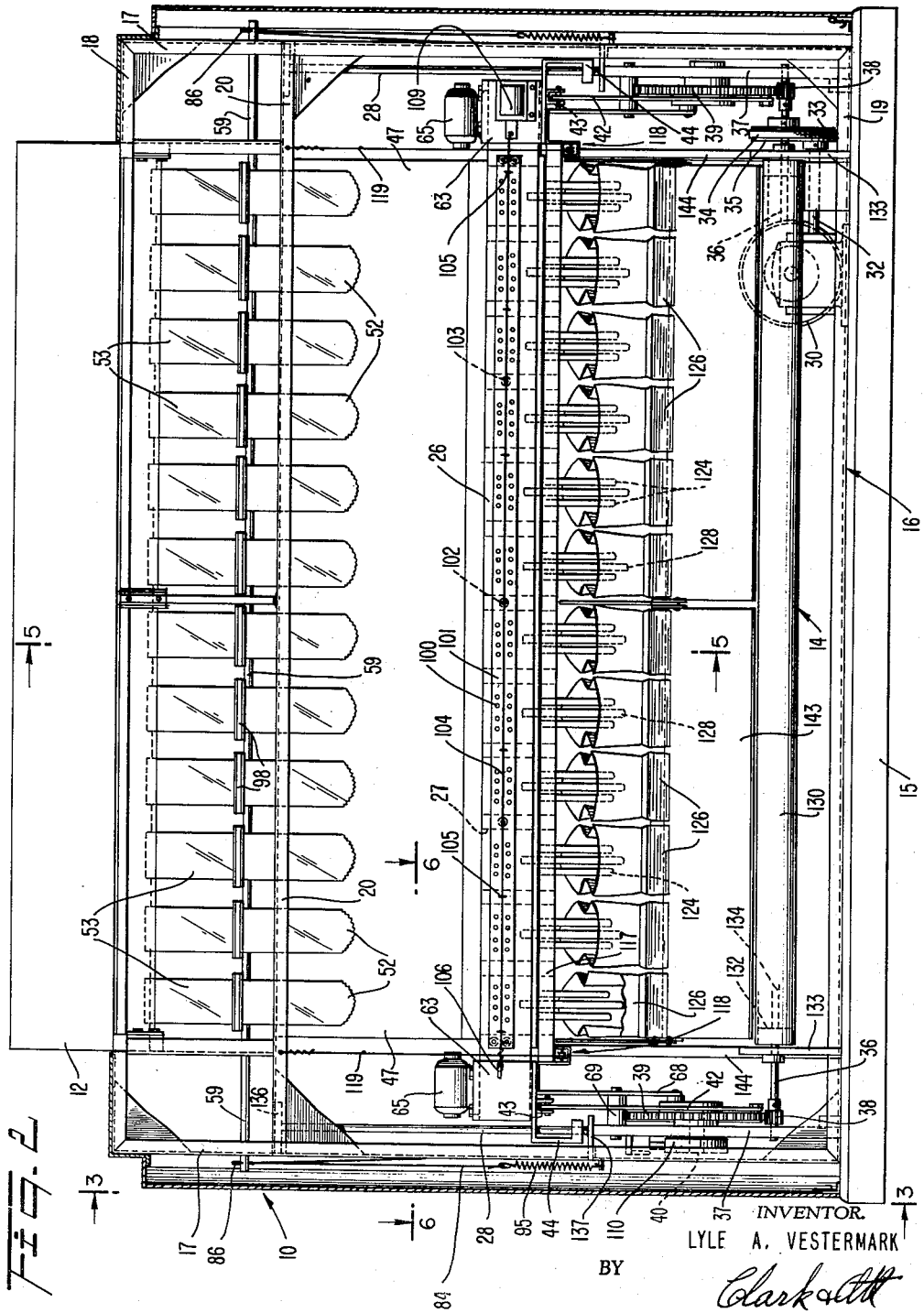

Dec. 10, 1963  L. A. VESTERMARK  3,113,530
APPARATUS FOR FILLING BUNS WITH AN EDIBLE PRODUCT
Filed Feb. 12, 1962  6 Sheets-Sheet 3
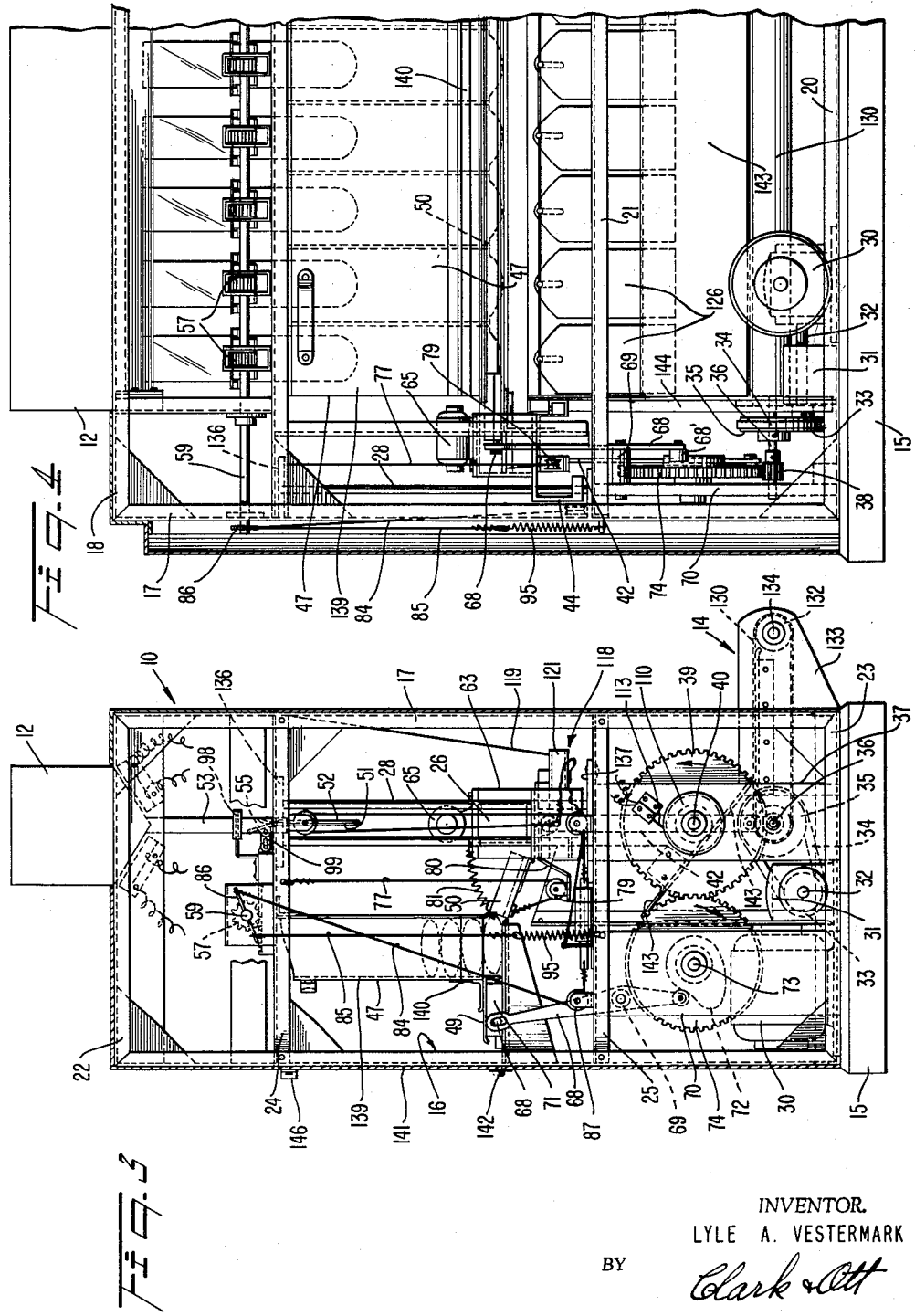
INVENTOR.
LYLE A. VESTERMARK
BY
*Clark & Ott*
ATTORNEYS

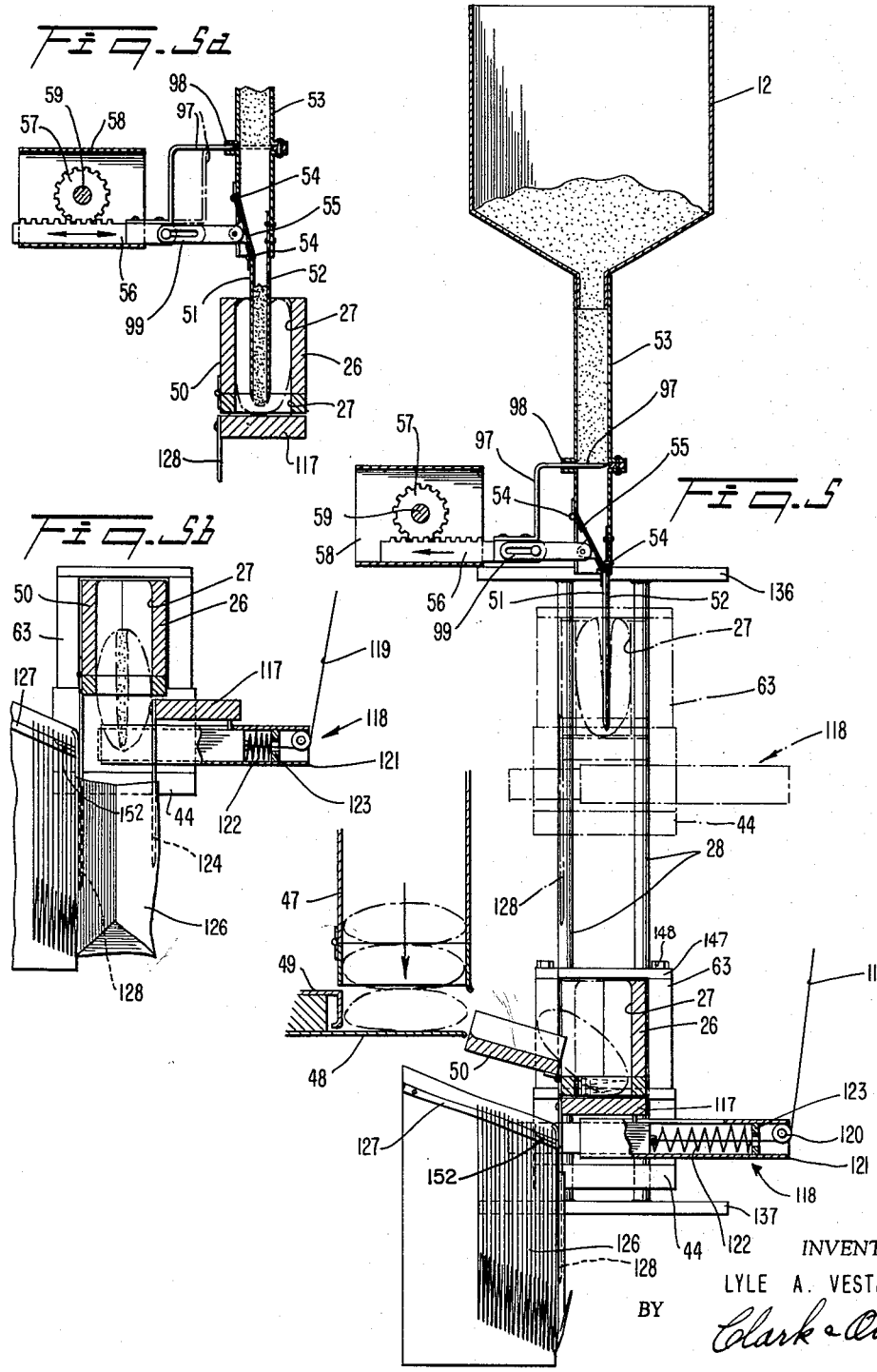

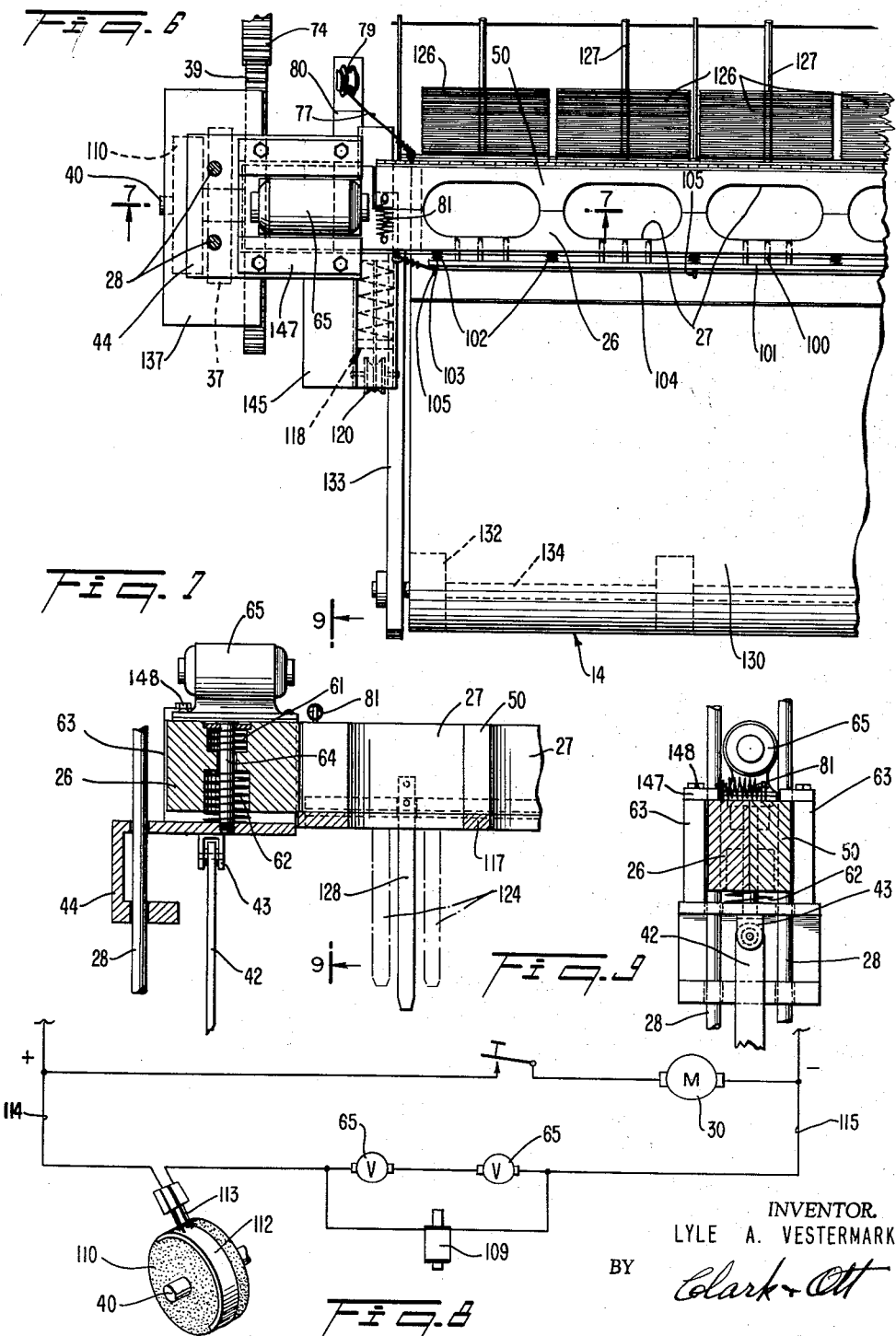

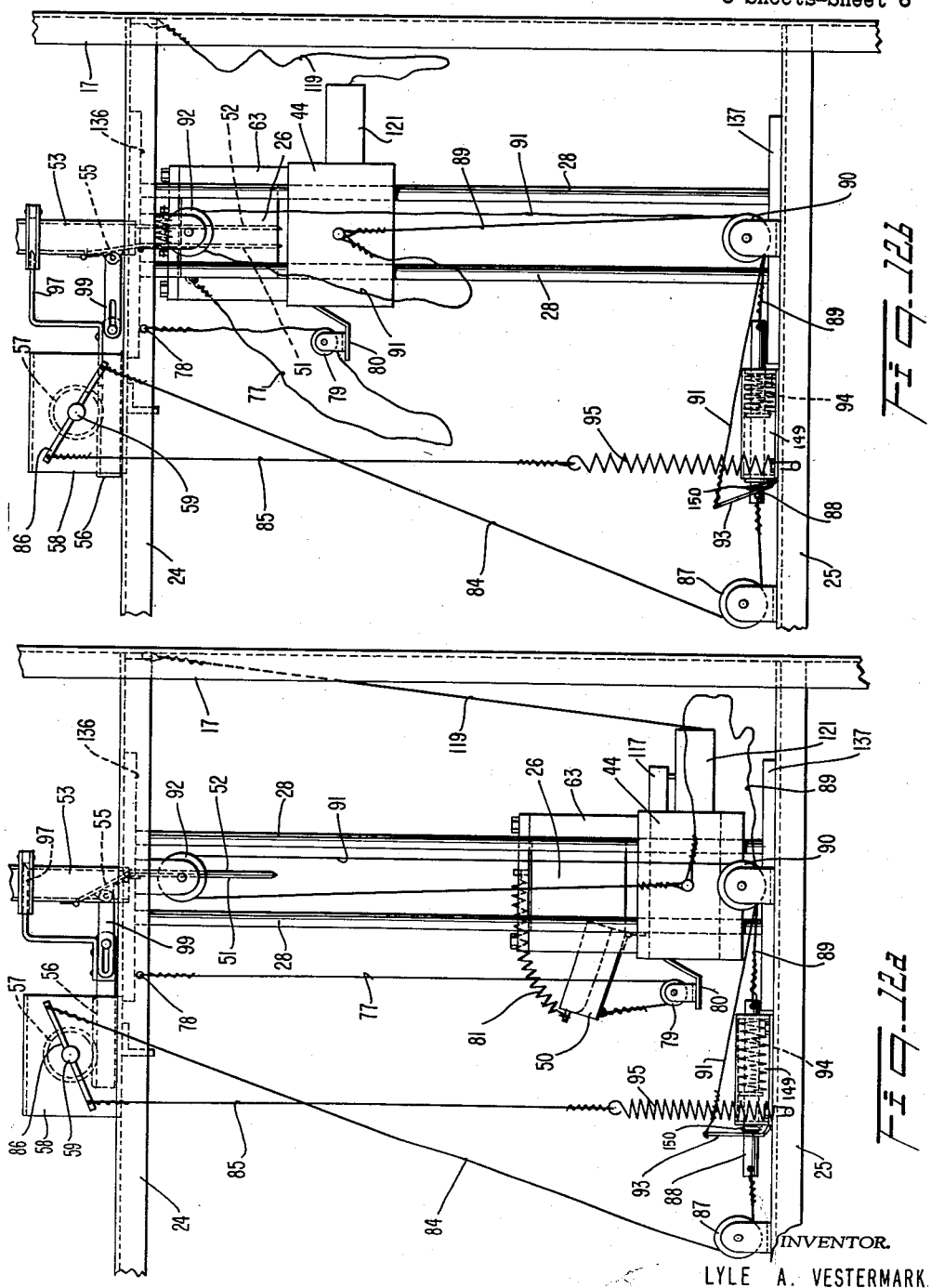

United States Patent Office 3,113,530
Patented Dec. 10, 1963

3,113,530
APPARATUS FOR FILLING BUNS WITH
AN EDIBLE PRODUCT
Lyle A. Vestermark, 1406 Eggert Place,
Far Rockaway, N.Y.
Filed Feb. 12, 1962, Ser. No. 172,469
11 Claims. (Cl. 107—1)

This invention relates to an apparatus for filling buns and the like with an edible product.

An object of the invention is to provide an apparatus for conveniently and expeditiously filling buns and the like with an edible product such as a meat product whereby the same may be continuously produced in quantities in heated condition for immediate consumption.

Another object of the invention is to provide an apparatus of said character having mechanisms for successively performing the operations of feeding buns into a holder, cutting the buns and separating the cut portions thereof, feeding a meat product between the cut portions and discharging the filled buns, all of said operations being performed in timed relation during a cycle of movement of the holder.

Still another object of the invention is to provide a series of mechanisms operating in unison for simultaneously performing each of said operations respectively whereby a plurality of filled buns are simultaneously discharged at the end of each cycle of movement of the holder.

A further object of the invention is to provide a bun holder having a plurality of cells into which the buns are simultaneously fed and from which the filled buns are simultaneously discharged and which holder has reciprocatory movement constituting a cycle of operation and rapid vibratory movement with the movement of the buns into engagement with knives for cutting the buns.

Still another object of the invention is to discharge each filled bun into a bag for convenience in delivery thereof to customers without the operator handling the buns.

With the aforegoing and other objects in view, reference is now made to the following specification and accompanying drawings in which the preferred embodiment of the invention is illustrated.

In the drawings:

FIG. 2 is a vertical sectional view through the housing with the mechanisms therein shown in elevation.

FIG. 3 is a vertical sectional view through the housing taken approximately on line 3—3 of FIG. 2 with the mechanisms shown in side elevations as viewed from the front.

FIG. 4 is a fragmentary view similar to FIG. 2 showing the rear side of the mechanisms in elevation.

FIG. 5 is an enlarged fragmentary sectional view taken approximately on line 5—5 of FIG. 2 showing the bun holder in full lines in position for receiving a bun and in broken lines a bun in the holder moved into engagement with the knife and spreader.

FIG. 5a is a fragmentary view showing the cut portions of the bun spread apart and filled with a measured quantity of the meat product.

FIG. 5b is a fragmentary view showing the filled bun released from the holder for discharge from the apparatus.

FIG. 6 is a fragmentary horizontal sectional view taken approximately on line 6—6 of FIG. 2.

FIG. 7 is a fragmentary sectional view taken approximately on line 7—7 of FIG. 6 and showing the vibratory means mounted on the bun holder for vibrating the holder during the bun cutting operation.

FIG. 8 is a diagrammatic view of the wiring circuit for the vibratory means for imparting vibratory movement to the holder when the buns are engaged by the knives and with the solenoid in circuit for moving the pins into engagement with the buns for retaining the same in fixed position in the holder during the cutting thereof.

FIG. 9 is a fragmentary sectional view taken approximately on line 9—9 of FIG. 7.

FIG. 12a is an enlarged fragmentary end view of the apparatus showing the bun holder in position for receiving the buns together with the arrangement of the control wires when the bun holder is in said position.

FIG. 12b is a similar view showing the bun holder in position for engagement of the knives and spreader with the buns together with the arrangement of the control wires when the bun holder is in said position.

Figure 1:
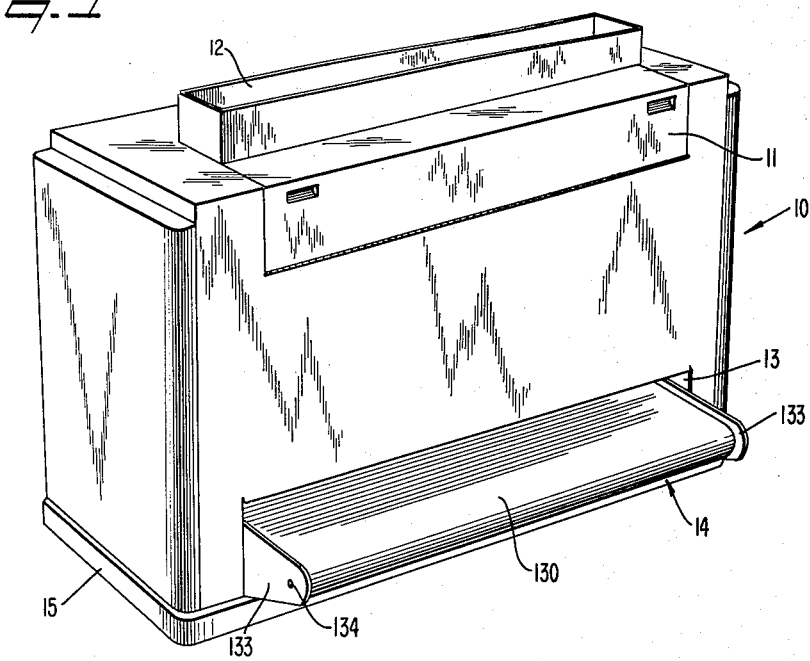
FIG. 1 is a perspective view of an apparatus for filling buns and the like with a meat product constructed in accordance with the invention.
Figure 10:
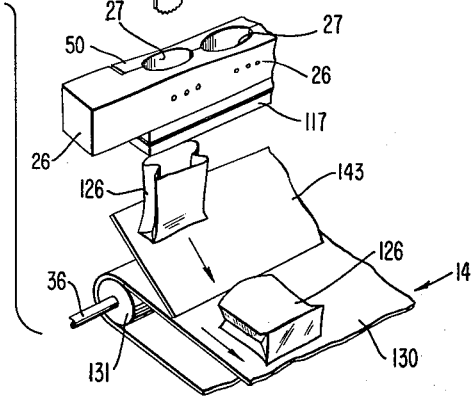
FIG. 10 is a fragmentary perspective view of the meat hopper, the bun holder and the discharge conveyor shown in separated juxtaposition.
Figure 11:
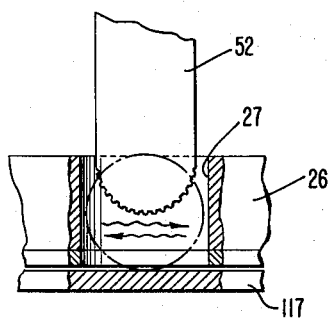
FIG. 11 is an enlarged fragmentary diagrammatic view of the bun holder with the bottom board closing the bottom outlet thereof and with a knife shown in cutting engagement with a bun in one of the cells thereof.

Referring to the drawings, the apparatus includes a housing 10 of any desired construction having a removable section 11 for gaining access to the interior thereof and with an elongated hopper 12 extending upwardly through the top wall thereof for containing a meat product to be fed to the buns. The housing is formed with an opening 13 adjacent the bottom thereof through which protrudes an endless conveyor 14 for the discharge of the filled buns.

The housing is affixed to a supporting base 15 and mounted on the base is a frame structure 16 preferably of angle iron construction which includes corner posts 17 and longitudinally extending upper, lower and intermediate frame members 18, 19, 20 and 21 at each side which are riveted or otherwise affixed at their ends to said corner posts. The frame structure also includes transversely extending upper, lower and intermediate frame members 22, 23, 24 and 25 at each end which are riveted or otherwise affixed at their ends to said corner posts.

Arranged to extend longitudinally of the frame structure is a holder 26 for receiving one or more buns, the present construction providing twelve cells 27 extending vertically therethrough for receiving twelve buns for simultaneously filling the same with the meat product. The holder is mounted for vertical reciprocatory movement on guide rods 28 affixed to the frame structure 16 and during each cycle of movement thereof in opposite directions, the operations of feeding buns into the holder, cutting the buns, separating the cut portions thereof, feeding a meat product between the cut portions and discharging the filled buns are successively performed by the apparatus.

Vertical reciprocatory movement is imparted to the holder by any desired means such as by an electric motor 30 affixed to the base 15 with the drive shaft thereof operatively connected with reduction gearing (not shown) within a gear box 31. The operating shaft 32 of the reduction gearing has a pulley 33 mounted thereon and over which is trained a drive belt 34 operating about a pulley 35 affixed to a shaft 36 and which shaft is journaled at its ends in upright plates 37 welded or otherwise affixed at their ends to the frame structure 16 adjacent the opposite ends thereof. The shaft 36 has gears 38 affixed thereto adjacent the plates 37 respectively which are in engagement with large gears 39 affixed to shafts 40. The shafts 40 are journaled for rotation on the plates 37 and eccentrically mounted on the gears 39 are connecting rods 42 having their upper ends pivoted to yokes 43 affixed to brackets 44 respectively. The brackets 44 support the bun holder 26 and have openings slidably mounting the same on the guide rods 28. The operation is such that with the rotation of the pulley 35 the gears 38 turn the large gears 39 and impart vertical reciprocatory movement to the holder with each rotation of the large gears 39.

Arranged forwardly of the bun holder is a hopper 47 extending longitudinally of the meat hopper 12 and which is provided with vertical compartments for receiving buns in stack formation therein, the compartments corresponding in number to the number of cells 27 in the holder. The hopper 47 is supported in any desired manner at its upper end between the frame members 24 with the open lower ends of the compartments spaced from a plate 48 extending longitudinally of the frame structure and affixed thereto at its ends. The hopper 47 is spaced from the plate 48 a distance to permit of the movement of ejectors 49 adapted to engage the lowermost buns respectively in the several stacks for discharging the same onto a hinged section 50 of the holder as shown in FIG. 5 of the drawings.

Disposed in vertical alignment with each cell 27 is a spreader blade 51 and a knife 52 having a serrated and arcuate lower edge. The knives 52 are affixed to and depend from vertically disposed chutes 53 of rectangular formation in cross section, each of the chutes being connected at its upper end to the meat hopper 12. The spreader blades 51 are of substantially the same width and length as the knives and are hinged at their upper ends as at 54 to gates 55, for movement thereof away from the knives with the opening of the gates to thereby spread the buns apart after the same are cut by the knives and between which blades and knives the meat product is fed from the chutes 53 into the buns. The gates 55 are affixed to rack bars 56 mounted for reciprocatory movement and disposed in engagement therewith are gears 57. The rack bars and gears are mounted on a bracket 58 extending longitudinally of the apparatus forwardly of the chutes 53 and which bracket is affixed at its ends to the frame member 24. The gears 57 are affixed to a shaft 59 operatively connected with driving means for opening the gates 55 in timed relation with the upward movement of the bun holder. With the filling of the cells of the bun holder with buns, the holder continues its upward movement into engagement with the knives 52 and spreader blade 51. For this purpose, the holder is mounted at its ends between upper and lower coil springs 61 and 62 as shown in FIG. 7 of the drawings, which springs are arranged in sockets therein with the lower springs 62 seated on the brackets 44 and the upper springs 61 disposed against the undersides of the bases of electrically driven vibrators 65, one of which is arranged at each end of the bun holder. The bases of the vibrators 65 extend beneath bars 147 and bolts 148 secure the bars and the brackets 63 to the brackets 44. Guide rods 64 extend through said coil springs with the lower ends thereof secured in upright relation on the brackets 44 to thereby retain the bun holder in position for vibratory movement between the brackets 63. It will be understood that the ends of the holder are spaced from the brackets 44 whereby the holder has floating support on the springs 62 for vibratory movement above the brackets 44 which is imparted thereto by said electrically driven vibrators 65. The vibratory movement thus imparted to the holder effects a cutting action of the knives 52 with the buns with the upward movement of the holder. The electrically driven vibrators 65 may be of any desired character and each may consist of an electric motor having an eccentrically mounted rotor or armature.

The ejectors 49 correspond in number to the number of compartments in the hopper 47 and movement is imparted thereto by rocker arms 68 pivotally mounted in hubs 69 affixed to upright plates 70 which plates are riveted or otherwise secured to the opposite ends of the frame structure 16. The upper ends of the rocker arms 68 have pin and slot connections with slide bars 71 to which the ejectors are affixed. The lower ends of said rocker arms have bearing engagement against cams 72 affixed to the shafts 73. The shafts 73 are journaled on the plates 70 and also affixed to the shaft 73 are large gears 74 disposed in meshing engagement with the gears 39. The gears 39 control the movement of the bun holder through the connecting rods 42 as herein described. Thus, the movement of the bun holder is in timed relation with the movement of the ejectors and the hinged section 50 is moved to open relation to receive the bun thereon with the downward movement of the holder. This is effected by means of cables 77 affixed to the hinged section 50 and to inwardly directed bars 78 affixed to the frame members 24. The cables are trained about pulleys 79 mounted on brackets 80 which are supported and movable with the brackets 44. It will be understood that with the downward movement of the bun holder the cables 77 will be tightened so as to swing the hinged section to open relation against the bias of springs 81 and with the upward movement of the bun holder following the discharge of buns onto the hinged section, the cables will become slackened whereby the springs 81 move the hinged section to closed relation so as to deposit the buns into the cells 27 in upright or edge relation.

The reciprocatory movement imparted to the rack bars 56 for opening the gates 55 as hereinbefore described is effected by cables 84 and 85 connected at their upper ends to the ends of a rock bar 86 affixed to each end of the shaft 59 with the cables 84 trained about pulleys 87 mounted on the frame members 25 respectively. The lower ends of said cables 84 are affixed to spring loaded piston rods 88 supported on the frame members 25. The inner ends of the piston rods 88 are attached to cables 89 which are trained over pulleys 90 supported on the frame members 25 respectively and with the ends of said cables attached to the bun holder. Cables 91 also attached to the bun holder are trained about said pulleys 90 and pulleys 92 depending from the frame members 24 and are connected to trigger releases 93 for releasing springs 94 which bias the rods 88 with the upward movement of the bun holder. The lower ends of the cables 85 are connected to springs 95 attached to the frame members 25. With the movement of the bun holder to its uppermost position, the piston rods 88 are moved to bias the springs 94 and set the trigger releases 93 and the gears 57 engaging the rack bars 56 are moved in a clockwise direction to open the gates 55. The gates remain open to fill the buns with the meat product until the knives and spreaders are out of engagement with the buns by the downward movement of the bun holder. The cables 91 become slackened and the trigger releases 93 are operated for releasing the springs 94 to thereby release the tension on the cables 84 whereupon the springs 95 pull the cables 85 to rock the gears 57 in a counterclockwise direction to thereby close the gates 55. Cut off plates 97 corresponding to the number of chutes 53 are mounted on the rack bars 56 for movement therewith for cutting off and opening up the chutes for feeding the meat product downwardly in timed relation with the movement of the gates 55. The cut off plates move through slots 98 in the forward side walls of the chutes and the pin and slot connections 99 provide slightly greater movement to the cut off plates than to the gates 55.

The piston rods 88 extend through apertures in the trigger releases 93 which are pivoted at their lower ends to tubular members 149 affixed to the frame 25 and in which the coil springs 94 are mounted on said rods. Coil springs 150 are arranged between the releases and the adjacent ends of said tubular members respectively which springs bias the releases into latching engagement with said rods when the cables 91 become slack and the rods are pulled to the right by the cables 89 as shown in FIG. 12b of the drawings.

The buns are held in fixed position in the cells 27 of the bun holder by a plurality of pins 100 for each cell which pins project from a longitudinally extending bar 101 mounted for sliding movement toward and away from the bun holder on supporting pins 102 carried by the bun holder. Coil springs 103 are disposed on the pins 102 for normally maintaining the said bar in spaced relation from the bun holder. The pins 100 are slidable in openings in the side wall of the bun holder and the bar 101 is moved inwardly against the bun holder by a wire 104 which extends longitudinally of said bar and is supported by eyelets 105. The said wire is fastened at one end as at 106 and is connected to a solenoid 109 mounted in fixed position on the other end of the bun holder 26. When the solenoid is energized the bar 101 is moved inwardly as shown in FIG. 6 of the drawings, by the tightening of the wire against the bar 101 so as to move the pins 100 into engagement with the buns. When the solenoid is deenergized the springs 103 move the bar outwardly to thereby move the pins out of engagement with the buns. This outward movement of the pins takes place with the downward movement of the bun holder and the same is effected by the rotation of a rotary switch 110 mounted on the shaft 40 adjacent one of the gears 39. Arranged on an arcuate portion of the periphery of the rotary switch 110 is a conductor plate 112 adapted to be engaged by spaced brushes 113 which are supported by and insulated from the adjacent plate 57. Conductor wires 114 and 115 connect said brushes in a circuit leading to a suitable electrical power source as shown schematically in FIG. 8 of the drawings. The vibrators 65 are in series in said circuit with the solenoid 109 in a shunt circuit about said vibrators whereby the vibrators and solenoid function simultaneously when the brushes 113 are in engagement with the conductor plate 112 of the rotary switch.

The cells 27 open through the top and bottom of the bun holder with the bottom outlets adapted to be closed by a bottom board 117 extending longitudinally of the bun holder adjacent the underside thereof and which is slidably mounted at its ends on the brackets 44. Affixed to the bottom board at the ends thereof are spring loaded means 118 to which cables 119 are attached with the upper ends of the cables affixed to the frame members 20 and which cables operates over pulleys 120 mounted on the outer ends of said spring loaded means. The said spring loaded means includes cylinders 121 in which coil springs 122 are arragned with the cables 119 attached to the inner ends of said coil springs respectively and with the outer ends of the springs biased against abutments 123 through which the cables extend. The cables 119 are in slackened condition until the bun holder approaches the bottom of its stroke when the cables become taut to compress the springs 122 and effect outward movement of the bottom board 117 to thereby open the bottom of the cells 27 for the discharge of the buns from the several cells onto the conveyor 14. With the upward movement of the bun holder the cables 119 become slackened so that the compressed springs move the bottom board into position to close the bottom of the cells and when this takes place the hinged section 50 of the bun holder is in open relation for receiving buns thereon.

Attached to and depending from the bottom board 117 are pairs of spaced fingers 124 which move downwardly therewith to enter the open ends of bags 126 for receiving the filled buns. The bags 126 are arranged in stacks slidably hung on inclined rods 127, the stacks corresponding in number to the number of cells. The pairs of fingers 124 also correspond in number to the number of cells and disposed between each of said pairs of fingers is a finger 128 which is affixed to one side of the bun holder and moves downwardly therewith to engage in the lowermost bags. The fingers 124 move with the bottom board to dispose the same in outwardly spaced relation from the fingers 128 and thereby move the outer side walls of the lowermost bags in spaced apart relation from the side walls thereof held by the fingers 128. This disposes the open tops of the bags below the cells 27 whereby the buns are gravitationally discharged into the bags respectively.

It will be understood that a quantity of bags 126 are suspended from the inclined rods 127 respectively for each cell. One of the side walls of each of the bags is provided with a small aperture for suspending the bags from said inclined rods. The lower ends of said rods are provided with inclined knife edges 152 on which the lowermost bags are suspended and as the buns are deposited into the bags the weight thereof functions to slit the bags to free the same from the inclined rods whereupon the filled bags fall onto an inclined board 143 and thence onto the conveyor 14. The inclined board 143 is affixed at its ends to upright frame members 144 which are welded or otherwise affixed to the frame structure 16.

The conveyor 14 extends longitudinally below the bun holder with the discharge end thereof protruding through the casing 10. The conveyor includes an endless belt 130 which operates over a series of inner and outer rollers 131 and 132, the inner roller being affixed to the shaft 36 and the outer roller being affixed to a shaft 134. The said shafts are journaled in end plates 133 affixed to the frame member 144 with the shaft 36 operatively connected with the large gear 39 and constituting a drive shaft for the conveyor.

The guide rods 28 at each end of the apparatus are affixed at their upper and lower ends to flat plates 136 and 137 respectively which are welded or otherwise affixed to the frame members 24 and 25 to extend inwardly therefrom. The spring loaded means 118 together with the pulley 120 at each end of the apparatus are supported by a plate 145 which is bolted or otherwise affixed to the brackets 44 as shown in FIG. 6 of the drawings.

The outer wall of the hopper 47 is provided with a section 139 which is hinged at 140 to permit of the outward swinging thereof into inclined relation for filling the hopper with rolls in stacked formation for each cell 27. The housing 10 is provided with a section 141 which is hinged as at 142 for outward swinging movement thereof for gaining access to the hopper for filling the same and which section is adapted to be secured in closed relation by a latch 146.

The vibratory movement imparted to the bun holder when the knives and blades are in engagement with the buns therein also imparts a vibratory movement to the chutes to thereby prevent the edible product becoming clogged in the chutes whereby the edible product freely feeds downwardly therein.

In operation, the hopper 12 and the chutes are filled with an edible product such as ground meat or other ground food product and the hopper 47 is filled with buns in stack formation for each cell. With the upward movement of the bun holder from lowered position each of the cells will be filled with a bun and with the upward movement thereof toward the uppermost position the buns will be engaged by the knives and blades to slit the buns. The gates open in timed relation with the movement of the bun holder to the uppermost position so as to spread the knives and blades apart. The meat product will then feed downwardly from the chutes into the buns between the knives and blades. With the downward movement of the bun holder to the lowered position the filled buns will be discharged from the bun holder and deposited in the bags which will be released from the supports. The bags will slide down the inclined board onto the conveyor where the same will be discharged through the housing of the apparatus. It will be understood that the aforesaid operation is continuous and with each complete reciprocatory movement of the bun holder filled buns from the several cells will be discharged from the apparatus.

While the preferred form of the invention has been shown and described herein, it will be understood that the same is not so limited but shall cover and include any and all modifications thereof which fall within the purview of the invention.

What is claimed is:

1. In an apparatus for filling buns with an edible product, a support, a hopper for containing the edible product, said hopper being affixed to said support and having a depending chute through which the edible product is discharged, a knife and a spreader blade carried by said chute, a hollow bun holder having open upper and lower ends, means carried by said support mounting said bun holder for vertical reciprocatory movement to dispose a bun positioned therein in engagement with said knife and blade to cut the bun with the upward movement of said bun holder and for discharging the filled bun with the movement thereof to a lowered position, rotary driven means operatively connected with said bun holder for imparting said reciprocatory movement thereto, a gate for closing said chute, means carried by said support and operatively connected with said gate for moving said gate to open relation and to spread said knife and blade apart when engaged by the bun in said bun holder for the deposit of said edible product in the bun between said knife and said blade, a bottom board mounted for movement with said bun holder and for relative movement to cover and uncover said open lower end thereof, and means operatively connected with said board and with said support for moving said board to said uncovered relation with the movement of the bun holder to said lowered position for the discharge of the filled bun from the bun holder.

2. In an apparatus for filling buns with an edible product as set forth in claim 1 in which said support is provided with inclined means for supporting bags thereon with the lowermost bag disposed below said bun holder at one side thereof, fingers depending from said bun holder and said bottom board and movable with said bun holder into engagement with said lowermost bag, and said finger carried by said bottom board moving therewith to open said lowermost bag to receive a filled bun from the bun holder with the movement of said bottom board to uncovered relation with said open lower end of said bun holder.

3. In an apparatus for filling buns with an edible product, a support, a hopper for containing the edible product, said hopper being affixed to said support and having a depending chute through which the edible product is discharged, a knife and a spreader blade carried by said chute, a hollow bun holder having open upper and lower ends, means carried by said support mounting said bun holder for vertical reciprocatory movement to dispose a bun positioned therein in engagement with said knife and blade with the upward movement of said bun holder and for discharging the filled bun with the movement thereof to a lowered position, rotary driven means, reciprocatory means operatively connected with said bun holder and with said rotary driven means for imparting said reciprocatory movement to said bun holder, motor driven vibratory means carried by said bun holder, means carried by said rotary driven means for connecting the motor of said vibratory means in an electric circuit in timed relation with the movement of said bun holder into engagement with said knife and spreader blade for cutting the bun, a gate for closing said chute, means carried by said support and operatively connected with said gate for moving said gate to open relation and to spread said knife and blade apart when engaged by the bun in said bun holder for the deposit of said edible product in the bun between said knife and said blade, a bottom board mounted for movement with said bun holder and for relative movement to close the bottom opening therein, means operatively connected with said board and with said support for moving said board to open relation with the movement of the bun holder to said lowered position for the discharge of the filled bun from the bun holder.

4. In an apparatus for filling buns with an edible product as set forth in claim 3 in which said support is provided with inclined means for supporting bags thereon with the lowermost bag disposed below said bun holder at one side thereof, fingers depending from said bun holder and said bottom board and movable with said bun holder into engagement with said lowermost bag, and said finger carried by said bottom board moving therewith to open said lowermost bag to receive a filled bun from the bun holder with the movement of said bottom board to uncovered relation with said open lower end of said bun holder.

5. In an apparatus for filling buns with an edible product, a support, a hopper for containing the edible product, said hopper being affixed to said support and having a depending chute through which the edible product is discharge, a knife and a spreader blade carried by said chute, a bun hopper affixed to said support and having an outlet for discharging a bun one at a time therefrom, a hollow bun holder having open upper and lower ends, means carried by said support mounting said bun holder for vertical reciprocatory movement to dispose a bun positioned therein in engagement with said knife and blade to cut the bun with the upward movement of said bun holder and for discharging the filled bun with the movement thereof to a lowered position, rotary driven means operatively connected with said bun holder for imparting said reciprocatory movement thereto, a gate for closing said chute, means carried by said support and operatively connected with said gate for moving said gate to open relation and to spread said knife and blade apart when engaged by the bun in said bun holder for the deposit of said edible product into the bun between said knife and said blade, a bottom board mounted for movement with said bun holder and for relative movement to open and close the lower opening therein, means operatively connected with said board and with said support for moving said board to open relation with the movement of the bun holder to said lowered position for the discharge of the filled bun from the bun holder, means carried by said support for supporting the buns in said bun hopper with the lowermost bun disposed in position for discharge therefrom, an ejector slidable on said last mentioned means, and means operatively connected with said ejector and with said rotary driven means for ejecting the lowermost bun from the bun hopper for supplying the bun holder with a bun at its said lowered position.

6. In an apparatus for filling buns with an edible product, a support, a hopper for containing the edible product, said hopper being affixed to said support and having a depending chute through which the edible product is discharged a knife and a spreader blade carried by said chute, a bun hopper affixed to said support and having an outlet for discharging a bun one at a time therefrom, a hollow bun holder having open upper and lower ends, means carried by said support mounting said bun holder for vertical reciprocatory movement to dispose a bun positioned therein in engagement with said knife and blade to cut the bun with the upward movement of said bun holder and for discharging the filled bun with the movement thereof to a lowered position, rotary driven means operatively connected with said bun holder for imparting said reciprocatory movement thereto, a gate for closing said chute, means carried by said support and operatively connected with said gate and with said bun holder for moving said gate to open relation and to spread said knife and blade apart when engaged by the bun in said bun holder with the upward movement of the bun holder for the deposit of said edible product into the bun between said knife and said blade, a bottom board mounted for movement with said bun holder and for relative movement to open and close the lower opening therein, means operatively connected with said board and with said support for moving said board to open relation with the movement of the bun holder to said lowered position for the discharge of the filled bun from the bun holder, said bun holder having a wall portion movable to open and closed relation, means operatively connected with said wall portion and movable with the bun holder for moving said wall portion to open relation with the downward movement of said bun holder and to closed relation with the upward movement thereof, means carried by said support for supporting the buns therein with the lowermost bun disposed in position for discharge therefrom, an ejector slidable on said last mentioned means, and means operatively connected with said ejector and with said rotary driven means for ejecting the lowermost bun onto said wall portion of the bun holder when said wall portion is in said open relation for supplying the bun holder with a bun at its said lowered position.

7. In an apparatus for filling buns with an edible product, a support, a hopper for containing the edible product, said hopper being affixed to said support and having a depending chute through which the edible product is discharged, a knife and a spreader blade carried by said chute, a hollow bun holder having open upper and lower ends, means carried by said support mounting said bun holder for vertical reciprocatory movement to dispose a bun positioned therein in engagement with said knife and blade to cut the bun with the upward movement of said bun holder and for discharging the filled bun with the movement thereof to a lowered position, rotary driven means, means operatively connected with said bun holder and with said rotary driven means for imparting said reciprocatory movement to said bun holder, a gate for closing said chute, means carried by said support and operatively connected with said gate and with said rotary driven means for moving said gate to open relation and to spread said knife and blade apart when engaged by the bun in said bun holder for the deposit of said edible product in the bun between said knife and said blade, means slidably associated with said bun holder for rigidly holding a bun therein, means supporting said bun holding means operatively connected with electrical actuating means for imparting movement to said bun holding means to dispose the same in engagement with the bun with the upward movement of the bun holder and for withdrawing said means from engagement with the bun with the downward movement of said bun holder, means carried by said rotary driven means connecting said electrical actuating means in an electric circuit in timed relation with said movement of the bun holder for imparting said movements to said bun holding means, and a bottom board mounted for movement with said bun holder and for relative movement to cover and uncover the open lower ends of the bun holder, means operatively connected with said board and with said support for moving said board to uncover the open lower end of said bun holder with the movement of the bun holder to said lowered position for the discharge of the filled bun from the bun holder.

8. In an apparatus for filling buns with an edible product, a support, a hopper for containing the edible product, said hopper being affixed to said support and having a plurality of depending chutes through which the edible product is discharged, a knife and a spreader blade depending from each of said chutes, a bun holder having a plurality of cells corresponding in number to the number of said chutes and which cells open through the upper and lower ends of the bun holder, means carried by said support mounting said bun holder for vertical reciprocatory movement to simultaneously dispose buns positioned in the cells in engagement with said knives and blades to thereby cut the buns therein with the upward movement of the bun holder and for discharging the filled buns with the movement of the bun holder to a lowered position, rotary driven means, reciprocatory means operatively connected with said bun holder and with said rotary driven means for imparting said reciprocatory movement to the bun holder, a gate for closing each of said chutes, means carried by said support and operatively connected with said gates and with said motor driven means for simultaneously moving said gates to open relation and to simultaneously spread the knives and blades depending from said chutes when engaged by buns in said bun holder for the deposit of said edible product in the buns between said knives and blades, a bottom board mounted for movement with said bun holder and for relative movement to cover and uncover the open lower ends of said cells, and means operatively connected with said board and with said support for moving said board to simultaneously uncover the open lower ends of said cells with the movement of said bun holder to said lowered position for the simultaneous discharge of the filled bun from the cells of the bun holder.

9. In an apparatus for filling buns with an edible product as set forth in claim 8 in which said support is provided with inclined means corresponding to the number of said cells for supporting bags thereon with the lowermost bags disposed below said bun holder at one side thereof, fingers depending from said bun holder and said bottom board and movable with said bun holder into engagement with said lowermost bags, and said fingers carried by said bottom board being movable therewith to open said lowermost bags to receive filled buns from the bun holder with the movement of said bottom board to uncovered relation with said open lower ends of the cells of said bun holder.

10. In an apparatus for filling buns with an edible product, a support, a hopper for containing the edible product, said hopper being affixed to said support and having a plurality of depending chutes through which the edible product is discharged, a knife and a spreader blade depending from each of said chutes, a bun holder having a plurality of cells corresponding in number to the number of said chutes and which cells open through the upper and lower sides of the bun holder, means carried by said support mounting said bun holder for vertical reciprocatory movement to simultaneously dispose buns positioned in the cells in engagement with said knives and blades to thereby cut the buns therein with the upward movement of the bun holder and for discharging the filled buns with the movement of the bun holder to a lowered position, rotary driven means, reciprocatory means operatively connected with said bun holder and with said rotary driven means for imparting said reciprocatory movement to the bun holder, a gate for opening and closing each of said chutes, means carried by said support and operatively connected with said gates and with said motor driven means for simultaneously moving said gates to open relation with the upward movement of said bun holder and to simultaneously move said gates to closed relation with the downward movement thereof, said blades moving with said gates to simultaneously space the blades from the knives when engaged by the buns in said bun holder for the deposit of said edible product in the buns between said knives and blades, a bottom board mounted for movement with said bun holder and for relative movement to cover and uncover the open lower ends of said cells, and means operatively connected with said board and with said support for moving said board to simultaneously uncover the open lower ends of said cells with the movement of said bun holder to said lowered position for the simultaneous discharge of the filled bun from the cells of the bun holder.

11. In an apparatus for filling buns with an edible product as set forth in claim 10 in which said support is provided with inclined means corresponding to the number of said cells for supporting bags thereon with the lowermost bags disposed below said bun holder at one side thereof, fingers depending from said bun holder and said bottom board and movable with said bun holder into engagement with said lowermost bags, and said fingers carried by said bottom board being movable therewith to open said lowermost bags to receive filled buns from the bun holder with the movement of said bottom board to uncovered relation with said open lower ends of the cells of said bun holder.

References Cited in the file of this patent

UNITED STATES PATENTS

| | | |
|---|---|---|
| 1,777,830 | Estrin | Oct. 7, 1930 |
| 2,149,639 | Strietelmeier | Mar. 7, 1939 |
| 2,307,510 | Johnsen | Jan. 5, 1943 |
| 2,815,625 | Angell et al. | Dec. 10, 1957 |